(12) United States Patent
Huberty et al.

(10) Patent No.: US 12,306,762 B1
(45) Date of Patent: May 20, 2025

(54) DENY LIST FOR A MEMORY PREFETCHER CIRCUIT

(71) Applicant: Apple Inc., Cupertino, CA (US)

(72) Inventors: Tyler J. Huberty, Sunnyvale, CA (US); Eric J. Furbish, Austin, TX (US); Mridul Agarwal, Saratoga, CA (US); Peter G. Soderquist, Natick, MA (US); Sandeep Gupta, Santa Clara, CA (US); Stephen G. Meier, Los Altos, CA (US); Vivek Venkatraman, Sunnyvale, CA (US); Yanran Yang, Mountain View, CA (US); Sahil Kapoor, Sunnyvale, CA (US); Chandan Shantharaj, San Jose, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 18/323,283

(22) Filed: May 24, 2023

(51) Int. Cl.
   *G06F 12/08* (2016.01)
   *G06F 12/0862* (2016.01)

(52) U.S. Cl.
   CPC .... *G06F 12/0862* (2013.01); *G06F 2212/602* (2013.01)

(58) Field of Classification Search
   CPC .................. G06F 12/0862; G06F 2212/602
   USPC ....................................................... 711/200
   See application file for complete search history.

(56) References Cited

U.S. PATENT DOCUMENTS

| 7,873,791 | B1 | 1/2011 | Yu |
| 11,204,878 | B1 | 12/2021 | Pnsdesris et al. |
| 11,599,473 | B1* | 3/2023 | Lafford ............... G06F 12/0862 |
| 2003/0163649 | A1* | 8/2003 | Kapur ................. G06F 12/0862 |
| | | | 711/146 |
| 2007/0239940 | A1 | 10/2007 | Doshi et al. |
| 2011/0078380 | A1* | 3/2011 | Gendler ............. G06F 12/0862 |
| | | | 711/E12.024 |

* cited by examiner

*Primary Examiner* — Gautam Sain
(74) *Attorney, Agent, or Firm* — Kowert, Hood, Munyon, Rankin & Goetzel, P.C.; Scott W. Pape; Dean M. Munyon

(57) ABSTRACT

An apparatus includes a cache memory circuit, a prefetcher circuit, and a prefetch deny list circuit, including a plurality of entries, may be included. The cache memory circuit may be configured to store information retrieved from a lower-level memory. The prefetcher circuit may be configured to generate a prefetch request for a particular prefetch address. The prefetch deny list circuit may be configured to allocate, in response to an indication from the cache memory circuit that a previously prefetched address went unused, a given entry, of the plurality of entries, for the previously prefetched address. The prefetch deny list circuit may be further configured to determine whether a particular address for a particular prefetch request corresponds to an active one of the plurality of entries. In response to a determination that a particular active entry corresponds to the particular address, prefetch deny list circuit may deny the particular prefetch request.

20 Claims, 11 Drawing Sheets

600

```
┌─────────────────────────────────────────────────────────────────┐
│ Receiving, by a prefetch deny list circuit from a cache memory  │
│ circuit, an indication that a previously prefetched address     │
│ went unused.                                                    │
│ 610                                                             │
└─────────────────────────────────────────────────────────────────┘
                                │
                                ▼
┌─────────────────────────────────────────────────────────────────┐
│ Incrementing, by the prefetch deny list circuit, a count value  │
│ corresponding to the previously prefetched address.             │
│ 620                                                             │
└─────────────────────────────────────────────────────────────────┘
                                │
                                ▼
┌─────────────────────────────────────────────────────────────────┐
│ Receiving, by the prefetch deny list circuit from a prefetcher  │
│ circuit, an address indicator for a prefetch address for a      │
│ particular prefetch request to be performed.                    │
│ 630                                                             │
└─────────────────────────────────────────────────────────────────┘
                                │
                                ▼
┌─────────────────────────────────────────────────────────────────┐
│ In response to determining that a count value corresponding to  │
│ the prefetch address for the particular prefetch request        │
│ satisfies a threshold value, denying, by the prefetch deny      │
│ list circuit, the particular prefetch request.                  │
│ 640                                                             │
└─────────────────────────────────────────────────────────────────┘
```

Receiving, by a prefetch deny list circuit from a cache memory circuit, an indication that a prefetch address for a particular prefetch request has been hit.
710

---

Resetting, by the prefetch deny list circuit, a count value corresponding to the prefetch address for the particular prefetch request.
720

---

Receiving, by the prefetch deny list circuit from a prefetcher circuit, an address indicator for the prefetch address for a subsequent prefetch request to be performed.
730

---

In response to determining that the count value corresponding to the prefetch address fails to satisfy a threshold value, allowing, by the prefetch deny list circuit, the subsequent prefetch request to be processed.
740

Receiving, by the prefetch deny list circuit from the cache memory circuit, a different indication that a different prefetched address went unused.
810

In response to determining that a count value corresponding to the different prefetched address has not been created, initializing a corresponding count value with a value of zero.
820

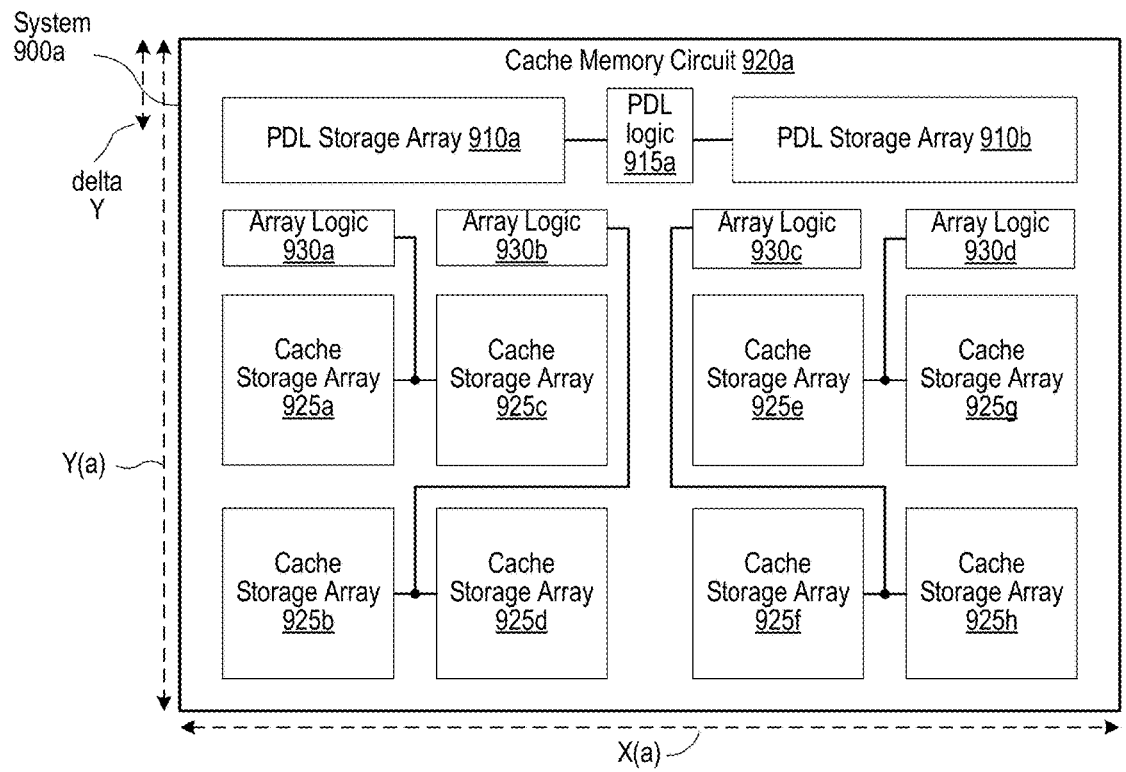
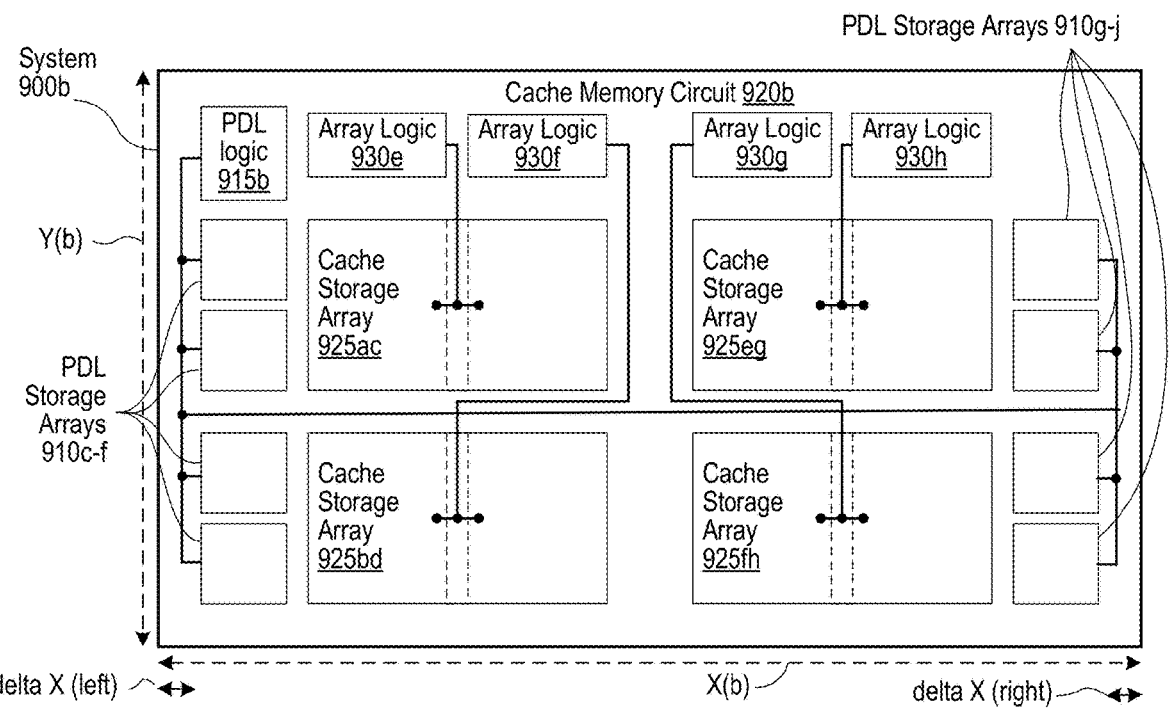
FIG. 9

DENY LIST FOR A MEMORY PREFETCHER CIRCUIT

BACKGROUND

Technical Field

Embodiments described herein are related to computing systems, including systems-on-a-chip (SoCs). More particularly, embodiments are disclosed to techniques for managing memory request queues on an SoC.

Description of the Related Art

Integrated circuits (ICs), including systems-on-a-chip (SoCs), may access memory circuits that require multiple processor cycles to fulfil. In order to alleviate performance bottlenecks due to waiting for instructions and/or data to be fetched from a long-lead time memory circuit, some processors utilize prefetcher circuits to generate memory requests for memory addresses that are predicted to be needed prior to a hard request for the memory at these addresses, storing the prefetched information in a respective cache line in a cache circuit. Memory prefetchers, however, may be very aggressive, and may prefetch cache lines that go unused before being evicted. Caching of information that goes unused may result in useful cache lines being displaced to make room for prefetched cache lines, and/or the consumption of memory circuit bandwidth to fulfill the prefetch request that could otherwise be put to use fetching information that will be used. Additionally, prefetching unused cache lines consumes power unnecessarily, particularly if the prefetch goes all the way to an external memory circuit (the most power-consuming requests).

BRIEF DESCRIPTION OF THE DRAWINGS

The following detailed description makes reference to the accompanying drawings, which are now briefly described.

FIG. 6 depicts a flow diagram of an embodiment of a method for implementing a prefetch deny circuit.

FIG. 7 illustrates a flow diagram of an embodiment of a method for training a prefetch deny circuit.

FIG. 9 illustrates two block diagrams of implementations of a prefetch deny list in respective embodiments of a cache memory circuit.

Figure 1:
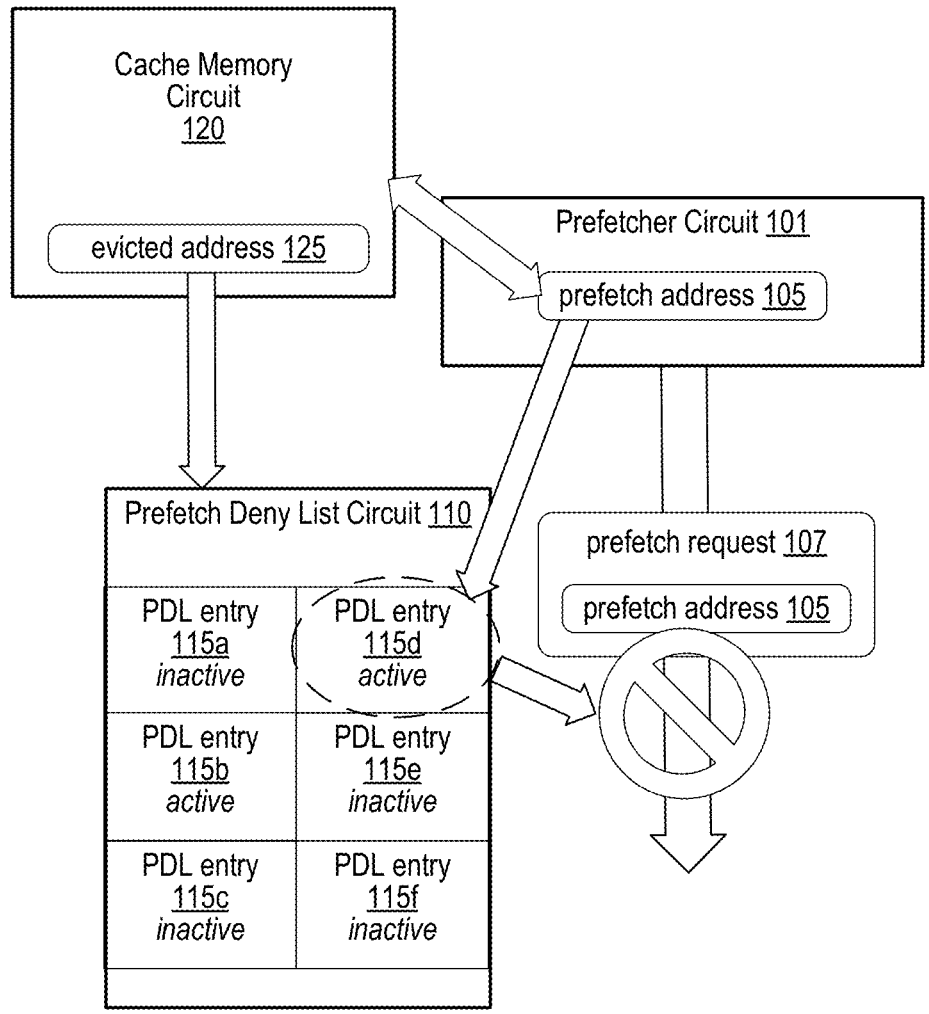
FIG. 1 illustrates a block diagram of an embodiment of a system that includes a prefetcher circuit, a prefetch deny list circuit, and a cache memory circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As disclose above, prefetcher circuits may be used to generate memory requests to fetch information stored in one or more levels of memory circuits before code execution causes a memory request for the information. Generally speaking, a memory request is issued when code execution causes an access to a particular memory location. Such accesses may be a result of needing a next instruction to execute from a program located in the memory, and including the particular memory location, or may be a result of reading data from a variable, a table, a file, and the like, that is stored at the particular memory location. A typical system may include two or more levels of memory circuits, with different levels having different storage capacities, as well as different read and write access times. Higher-level memory circuits may include level 1 (L1) caches, such as instruction and data caches implemented within a processor core or very close to a processor core in order to reduce access times. Such caches, however, may be small when compared to lower-level memories. System memory circuits may include Dynamic Random-Access Memories (DRAM) that are located on a different IC from the processor core. DRAMs may have much greater capacities than L1 cache circuits, but access times may be tens or hundreds of system clock cycles compared to ones of cycles for accessing an L1 cache. In various embodiments, one or more level 2 (L2) and level 3 (L3) caches may reside between L1 cache and system memory.

Prefetcher circuits may be used to predict memory locations that will be accessed in the near future by currently executing code. As a particular application and/or process executes, portions of code may be repeatedly executed, allowing a prefetcher circuit to learn the flow of execution of the code and thereby predict which memory locations may be accessed soon. The prefetcher circuit may issue a memory request to prefetch one or more cache lines of information from a lower-level memory circuit and then store the prefetched information in a respective cache line in a higher-level cache circuit associated with the prefetcher circuit.

In an attempt to increase efficiency, memory prefetcher circuits may be configured to be aggressive, prefetching multiple cache lines of information farther in advance of a need. As cache lines are prefetched farther in advance of their need, the likelihood of code execution deviating from a previous execution path increases, thereby resulting in one or more prefetched cache lines going unused before being evicted to make room in the cache memory for other information needed for the current execution path. A cache entry (e.g., a cache line) being used or not used may also be referred to as being touched or untouched. As used herein, a "touched" cache entry refers to a cache entry that is accessed after being filled and validated and prior to being evicted. Conversely, an "untouched" cache entry refers herein to a cache entry that is never accessed after being filled and validated and prior to being evicted. Caching of information that goes unused may result in premature filling of the cache memory resulting in used information being evicted too early, wasted cycles in memory management circuits to retrieve the requested prefetch information, and a corresponding waste of power to perform unnecessary memory requests and evicting and reloading cache lines until the needed information is cached.

A prefetch deny list (PDL) may be implemented to identify prefetched cache lines that have been repeatedly prefetched but not used. This PDL may be implemented as a table in which a particular entry is indexed using a first portion of a particular physical address of a prefetch request, and is then tagged, for example, with a hash of remaining bits of the physical address. This particular entry may also include a count indicating a number of consecutive times that the particular physical address has been fetched, but not touched. The PDL may be read using a corresponding physical address for each prefetch request. If a PDL entry corresponding to the physical address has been created and the count exceeds a threshold, then the prefetch request may be dropped.

The present disclosure considers novel circuits for use in an integrated circuit (IC) to implement a prefetch deny circuit to review memory requests sent from a prefetcher circuit to a memory circuit. An example apparatus (e.g., an IC) may include a cache memory circuit, a prefetcher circuit, and a prefetch deny list circuit. The cache memory circuit may store information retrieved from a lower-level memory. The prefetcher circuit may generate a prefetch request for a particular prefetch address. The prefetch deny list circuit may include a plurality of entries, and may, in response to an indication from the cache memory circuit that a previously prefetched address went unused, allocate, in the plurality of entries, a given entry for the previously prefetched address. In response to a particular prefetch request, the prefetch deny list circuit may determine whether a particular address for the particular prefetch request corresponds to an active one of the plurality of entries. In response to a determination that a particular active entry corresponds to the particular address, the prefetch deny list circuit may deny the particular prefetch request.

By identifying prefetch requests that frequently go unused, these unused prefetch requests may be denied rather than wasting resources such as cache space, power, and memory circuit bandwidth prefetching information that will likely go unused. A cache memory circuit may, therefore, be implemented with a smaller size if the cache lines are used more efficiently. Power requirements for the IC may be reduced, thereby allowing use of a smaller power source (e.g., battery) or improved battery life. Memory management circuits may have more bandwidth, thereby reducing overall memory access times and improving performance of the IC within a larger system.

FIG. 1 illustrates a block diagram of an embodiment of a system that uses a prefetch deny circuit to determine whether to deny a particular prefetch request from a prefetcher circuit. System 100 includes prefetcher circuit 101, prefetch deny list circuit 110, and cache memory circuit 120. Prefetch deny list circuit 110 includes a plurality of prefetch deny list (PDL) entries 115a-115f (collectively 115). In some embodiments, system 100 may be an IC, such as a system-on-chip (SoC). Such an SoC may further be a part of a computing system, such as a desktop or laptop computer, a smartphone, a tablet computer, a wearable smart device, or the like.

As illustrated, system 100 includes cache memory circuit 120 configured to store information retrieved (also referred to as "fetched") from a lower-level memory. Cache memory circuit 120 may be any given level of cache memory, for example, an L1 data cache, L1 instruction cache, L2 cache, L3 cache, and the like. In some embodiments, cache memory circuit 120 may correspond to more than one cache memory, such as both L1 data and instruction caches, or a plurality of L2 caches serving a variety of processor circuits in system 100. Cache memory circuit 120 includes a plurality of cache lines for storing information fetched from the lower-level memory. Cache management circuitry may be included for selecting a particular cache line in which to store fetched information. Such cache management circuitry may utilize any suitable technique for mapping ones of the cache lines to particular fetch address, such as direct mapping, fully associative, set associative and so forth. In addition, the cache management circuitry may track information about each cache line, e.g., a cache tag, that provides status of a given cache line such as validity, whether the current value is modified, whether the cache line was filled via a prefetch, and the like.

Prefetcher circuit 101, as shown, is configured to generate a prefetch request for a particular prefetch address, including prefetch request 107 for prefetch address 105. Information retrieved in response to fulfilling a given prefetch request is sent to cache memory circuit 120 for storage in one or more cache lines. Prefetcher circuit 101 may work in conjunction with other circuits, e.g., a next fetch prediction circuit (not shown), to determine a given prefetch address for a next prefetch request. In some embodiments, prefetcher circuit 101 may generate prefetch requests multiple fetch cycles prior to when the prefetched information may be needed by code executing in system 100. The farther in advance that a prefetch request is issued by prefetcher circuit 101, the more "aggressive" prefetcher circuit 101 may be considered. Aggressiveness may have a benefit of filling cache memory circuit 120 with needed information before code execution needs the information, allowing code execution to proceed with little to no delays for memory fetches. A drawback to aggressive prefetching, however, is that one or more cache lines in cache memory circuit 120 may occasionally be filled with information that goes unused and is eventually evicted. as described above, evicting unused cache lines may result in, for example, wasted power consumption, wasted cache space, and wasted memory system bandwidth.

To mitigate the undesired effects of unused cache line fills, system 100 includes prefetch deny list circuit 110. As shown, prefetch deny list circuit 110 includes a plurality of PDL entries 115. Prefetch deny list circuit 110 uses PDL entries 115 to track unused prefetched cache lines. In response to an indication from cache memory circuit 120 that a previously prefetched address went unused, allocate, in PDL entries 115, a given entry for the previously prefetched address. For example, cache memory circuit 120 sends an indication to prefetch deny list circuit 110 that a cache line corresponding to evicted address 125 was prefetched, has gone unused, and is now being evicted, e.g., evicted address 125 corresponds to an unused prefetch request. One of PDL entries 115 that corresponds to evicted address 125 is, if currently inactive, allocated to evicted address 125 and may be made active. In some embodiments, prefetch deny list circuit 110 makes the corresponding one of PDL entries 115 active after receiving two or more consecutive indications of the cache line for evicted address 125 being evicted unused. In other embodiments, the corresponding one of PDL entries 115 is made active after a single indication.

At a later point in time, prefetcher circuit 101 may determine that prefetch address 105 is an address to be used for a next prefetch request, e.g., prefetch request 107. For example, prefetcher circuit 101 may be further configured to generate prefetch request 107 in response to a determination that prefetch address 105 results in a cache miss in cache memory circuit 120. In response to determine that prefetch address 105 is to be used in prefetch request 107, prefetcher circuit 101 uses prefetch address 105 to access a corresponding one of PDL entries 115 in prefetch deny list circuit 110. Prefetch deny list circuit 110 determines whether prefetch address 105 corresponds to an active one of PDL entries 115. In the illustrated example, prefetch address 105 corresponds to PDL entry 115d. Any suitable technique may be used to map a given prefetch address to one of PDL entries 115. For example, a hash may be generated using some or all of the bits of prefetch address 105. In other embodiments, a portion of prefetch address 105 may be used to index into prefetch deny list circuit 110 without a hash.

In response to a determination that PDL entry 115d is active and corresponds to prefetch address 105, prefetch deny list circuit 110 may deny prefetch request 107. In some embodiments, prefetch deny list circuit 110 may send an indication to prefetcher circuit 101 to not issue prefetch request 107. In other embodiments, prefetcher circuit 101 may issue prefetch request 107 to a memory request queue in parallel with accessing prefetch deny list circuit 110. In such an embodiment, prefetch deny list circuit 110 may intercept prefetch request 107 before it reaches the memory request queue or cause the memory request queue to remove prefetch request 107. In such embodiments, prefetch deny list circuit 110 may be further configured to, in response to the determination to deny prefetch request 107, send an indication to prefetcher circuit 101 that prefetch request 107 was performed. This may allow prefetcher circuit 101 to retire, or otherwise remove, prefetch request 107 from a list of in-flight prefetch requests even though prefetch request 107 was never fulfilled.

If, however, PDL entry 115d were inactive rather than active, then prefetch deny list circuit 110 may be further configured to, in response to a determination that the PDL entry 115d has not been activated, allow prefetch request 107 to continue to be processed as normal. In such an embodiment, prefetch deny list circuit 110 does not indicate to prefetcher circuit 101 that prefetch request 107 has been fulfilled. Instead, prefetcher circuit 101 retires prefetch request 107 after the request has actually been fulfilled.

By utilizing prefetch deny list circuit 110 to deny prefetch requests that have previously resulted in unused cache lines, power consumption may be reduced by avoiding the activity associated with fetching information from the memory circuits. In addition, space in cache memory circuit 120 may be used more efficiently since occurrences of unused cache lines may be reduced. Furthermore, fewer memory requests may be sent to memory management circuits, thereby increasing a bandwidth of these memory circuits.

It is noted that system 100, as illustrated in FIG. 1, is merely an example. System 100 has been simplified to highlight features relevant to this disclosure. Elements not used to describe the details of the disclosed concepts have been omitted. For example, system 100 may include various additional circuits that are not illustrated, such as one or more processor circuits, memory management circuits, memory circuits, and the like. Although six PDL entries 115 are shown in prefetch deny list circuit 110, any suitable number of PDL entries may be included. A single prefetch deny list circuit is shown in FIG. 1. In other embodiments, however, multiple prefetch deny list circuits may be included. For example, an embodiment may include multiple cache memory circuits, some or all having a respective prefetch deny list circuit. In various embodiments, prefetcher circuit 101, prefetch deny list circuit 110, cache memory circuit 120, and other circuits of system 100 may be implemented using any suitable combination of sequential and combinatorial logic circuits. In addition, register and/or memory circuits, such as static random-access memory (SRAM) may be used in these circuits to temporarily hold information such as instructions, data, address values, and the like.

In FIG. 1, a prefetch deny list circuit is disclosed. Entries in this prefetch deny list are described as being active or inactive. Various techniques may be used to determine whether a given entry in a prefetch deny list is active or not. An example of one such technique for determining whether entries are active or inactive is depicted in FIG. 2.

Figure 2:
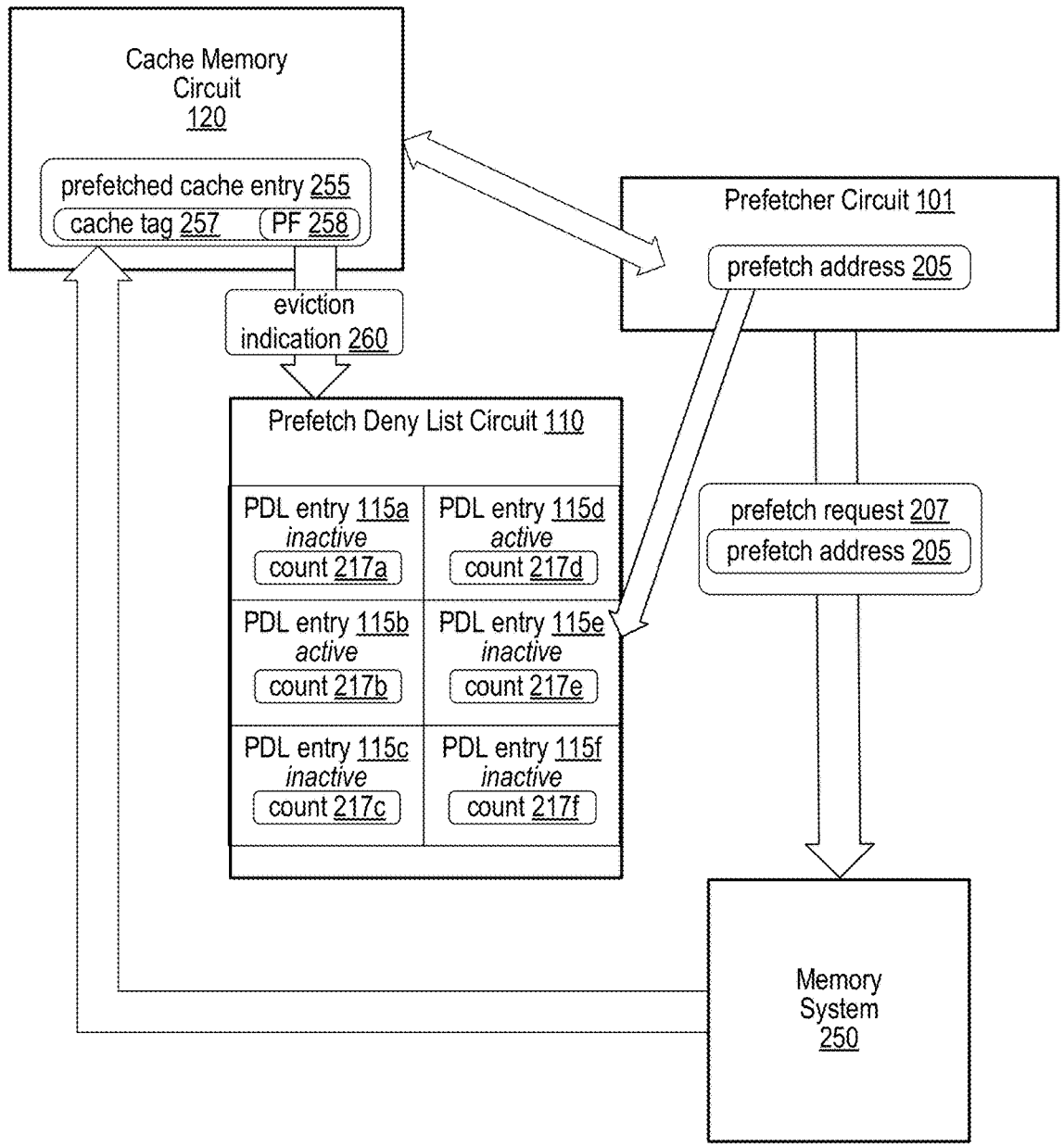
FIG. 2 shows a block diagram of another embodiment of the system of FIG. 1 that further includes a memory system.

Moving to FIG. 2, a block diagram of another embodiment of a system that uses a prefetch deny list circuit to determine whether to deny a particular prefetch request from a prefetcher circuit is shown. System 200 includes prefetcher circuit 101, prefetch deny list circuit 110, and cache memory circuit 120 from FIG. 1. In addition, system 200 includes memory system 250. Cache memory circuit 120 includes prefetched cache entry 255, and PDL entries 115 each include a respective one of counts 217a-217f (collectively 217). System 200, like system 100, may be a part of a computing system, such as a desktop or laptop computer, a smartphone, a tablet computer, a wearable smart device, or the like.

As described for system 100 in FIG. 1, system 200 includes cache memory circuit 120 that is configured to store information in a given cache entry (e.g., prefetched cache entry) in response to a first memory fetch (e.g., prefetch request 207). After some amount of time, cache memory circuit 120 may be configured to evict prefetched cache entry 255 to store, in prefetched cache entry 255, information from a second memory fetch. In response to the eviction of prefetched cache entry 255, cache memory circuit 120 may be configured to read prefetch indicator (PF 258) from cache tag 257 of the evicted prefetched cache entry 255. To indicate that prefetched cache entry 255 was filled in response to prefetch request 207, rather than a non-prefetch memory request, cache memory circuit 120 sets a particular value in the prefetch indicator bit, PF 258. In addition, cache memory circuit 120 may be further configured to reset PF 258 in response to a read access to prefetch address 205 that results in a hit to prefetched cache entry 255. Since the information stored in prefetch cache entry 255 has been accessed, prefetched cache entry 255 may be considered fetched by code execution, and PF 258 reset to indicate as such.

In response to a determination that the PF 258 is set, cache memory circuit 120 may send eviction indication 260 of an address of prefetched cache entry 255 to prefetch deny list circuit 110 as an indication that prefetched cache entry 255 went unused. Eviction indication 260 may include prefetch address 205 (the address of prefetch request 207 used to fill prefetched cache entry 255), in whole or in part, and/or cache tag 257. As shown, prefetch deny list circuit 110 is configured to determine that PDL entry 115e corresponds to prefetch address 205 included in prefetched cache entry 255 using cache tag 257. In some embodiments, if access to cache tag 257 is unavailable, cache memory circuit 120 may be configured to skip training of prefetch deny list circuit 110 for the given evicted cache entry.

If a determination is made that PDL entry 115e corresponds to prefetch address 205, included in prefetched cache entry 255, then prefetch deny list circuit 110 may be configured to increment count 217e in response to a determination that prefetched cache entry 255 was not accessed. Using address information in eviction indication 260, prefetch deny list circuit 110 may generate an index that identifies a particular one of PDL entries 115, e.g., PDL entry 115e. As shown, PDL entry 115e is inactive. If count 217e satisfies a threshold count value after the increment, then PDL entry 115e may become active. Otherwise, if the threshold is not satisfied, PDL entry 115e may remain inactive. PDL entry 115e, therefore, is activated after a threshold number of prefetches and evictions without cached information from prefetch address 205 being read. By using count 217e, several attempts to prefetch information from prefetch address 205 may be attempted before the corresponding PDL entry 115e is activated.

If, however, it is determined that prefetched cache entry 255 was accessed prior to eviction, then prefetch deny list circuit 110 may be configured to reset count 217e. For example, if PF 258 is reset rather than set, indicating that prefetch address 205 was used at least once, then prefetch deny list circuit 110 may reset count 217e to an initial value. In some embodiments, this initial value may be zero, and then incremented (or decremented) when a corresponding prefetch request goes untouched. In other embodiments, the initial value may be set to any suitable number and incremented (or decremented) in response to the corresponding prefetch request going untouched. Resetting count 217e may deactivate PDL entry 115e.

As illustrated, in response to receiving an indication of a subsequent prefetch request that includes prefetch address 205, then prefetch deny list circuit 110 may activate PDL entry 115e in response to a determination that count 217e satisfies a threshold value. For example, after the eviction of prefetched cache entry 255, as described above, causes count 217e to be incremented, this increment may result in count 217e satisfying the threshold value. The subsequent prefetch request may be a first prefetch request including prefetch address 205, resulting in PDL entry 115e being activated. Activating PDL entry 115e may cause the subsequent prefetch request to be denied.

Threshold values may be set to any suitable value. In some embodiments, the threshold value may be set to a higher value than an initial value with the delta corresponding to a maximum number of consecutive untouched prefetches that are acceptable for a given prefetch address. In such embodiments, the count is incremented each time the corresponding prefetch request goes untouched. In other embodiments, the threshold value may be set to a lower value than the initial value, and the count is decremented each time the corresponding prefetch request goes untouched. It is contemplated that some embodiments may include different thresholds for different PDL entries 115. For example, a particular set of PDL entries 115 may correspond to one particular memory address range while a different set of PDL entries 115 may correspond to a different memory address range. Different thresholds may be used between the particular and different sets, corresponding to different types of information stored in the particular and different memory ranges.

In some embodiments, prefetch deny list circuit 110 may be further configured to, in response to a determination that count 217e does not satisfy the threshold value, modify a priority of the subsequent prefetch request. A priority of a prefetch request, in some embodiments, determines a lifetime of a cache line filled in response to the prefetch request. A "lifetime," as used herein, refers to an amount of time (e.g., based on a number of system clock cycles, a number of cache accesses, a number of insertions, and the like) before a cache line is eligible to be evicted if not used. A cache line may be allotted a default lifetime. A lower priority for a prefetch request may result in a shorter than default amount of time before the associated prefetched cache line can be evicted, and vice versa for a higher priority prefetch request.

The modified priority of the subsequent prefetch request may be based on a value of count 217e. For example, if a current value of count 217e is the reset value, then this may indicate that a cache entry corresponding to prefetch address 205 (e.g., prefetched cache entry 255) was recently evicted after having been accessed. Since there is evidence that prefetch address 205 has been used, the subsequent prefetch request may be raised in priority, thereby increasing an amount of time before an eviction is allowed, with an expectation that the information at prefetch address 205 will be used again. Conversely, if the current value of count 217e is near, but not satisfying, the threshold, then it is evident that information at prefetch address 205 has been previously fetched unnecessarily one or more times. With an expectation that the information at prefetch address 205 will be evicted without being used again, the subsequent prefetch request may be lowered in priority thereby decreasing an amount of time until an eviction is allowed.

In other embodiments, the modified priority may cause the subsequent prefetch request to be performed in a different order with other prefetch requests in, e.g., a read request queue. For example, if a current value of count 217e is the reset value, then the subsequent prefetch request may be raised in priority, versus other fetch requests. If, however, the current value of count 217e is near, but not satisfying, the threshold, then the subsequent prefetch request may be lowered in priority versus other fetch requests.

It is noted that the example shown in FIG. 2 is associated with one depiction of a system utilizing a prefetch deny list circuit. A particular number of PDL entries 115 are shown, each with one respective count 217. In other embodiments, any suitable number of entries may be included and each entry may have a different number of count values. In some embodiments, system 100 may further include one or more additional circuits, such as one or more processor circuits, memory access circuits (e.g., direct-memory access circuits) and the like that cause the generation of prefetch requests. Although the prefetch indicator PF 258 is described as a single data bit, any suitable number of bits may be included, thereby allowing multiple indications (e.g., two bits could be used to indicate not a prefetch, a single cache line prefetch, or a multi-cache line prefetch). In various embodiments, any particular value of PF 258 may be used to indicate the different types of fetches.

Figure 3:
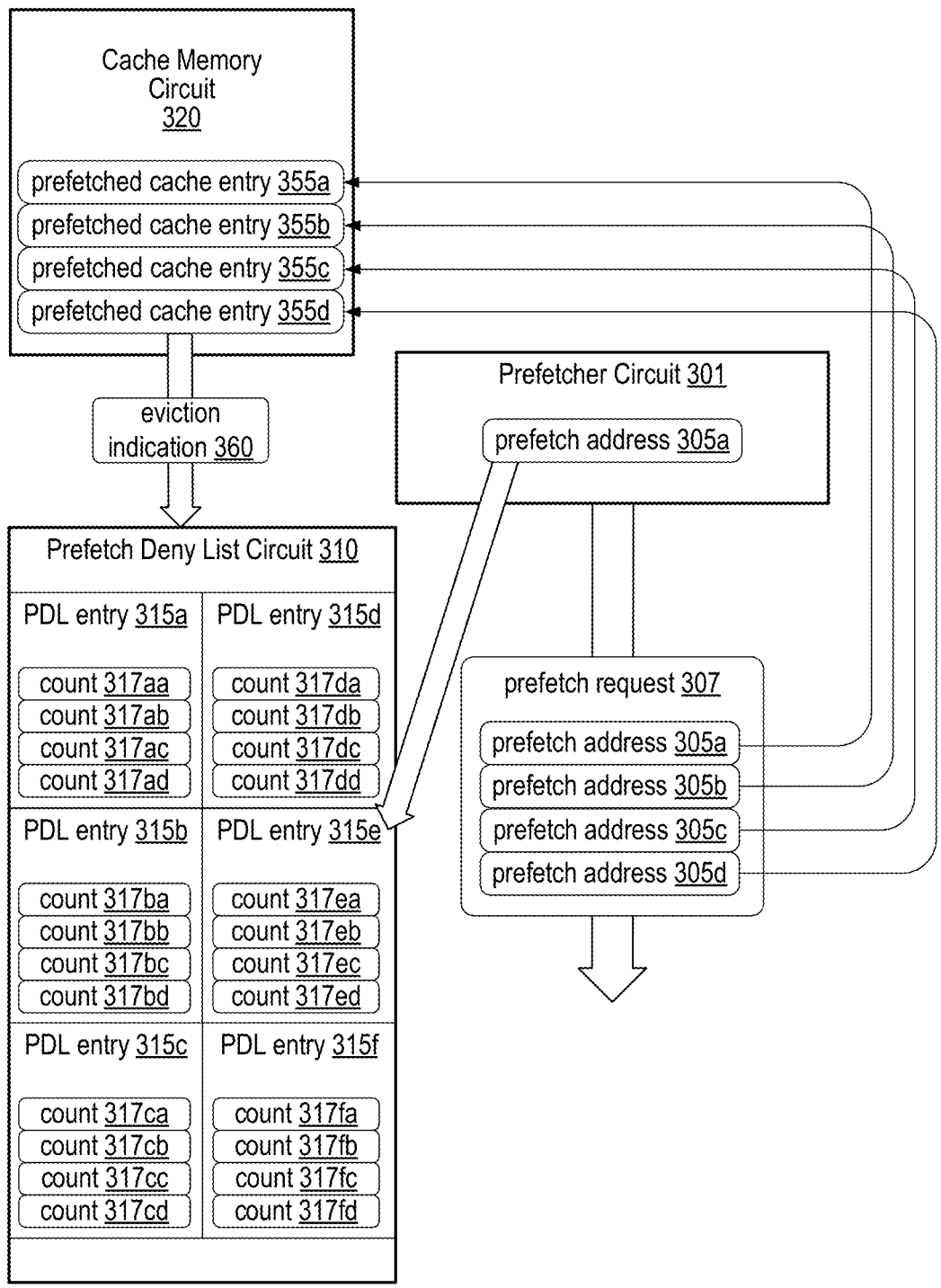
FIG. 3 depicts a block diagram of an embodiment of a system that includes a prefetch deny list circuit in which a given entry is used to track multiple cache lines.

In the descriptions of FIGS. 1 and 2, PDL entries are described as being associated with one prefetch address at a given time. In some systems, prefetch requests may include a plurality of prefetch address that cause more than one cache line to be filled. In such cases, a given PDL entry may be configured to track use of more than one prefetch address concurrently. FIG. 3 illustrates such an embodiment.

Turning to FIG. 3, a block diagram of an embodiment of a system that uses a prefetch deny list circuit that supports multiple cache lines per prefetch request is shown. System 300 includes similar elements as systems 100 and 200 in FIGS. 1 and 2. As illustrated, prefetcher circuit 301, prefetch deny list circuit 310, and cache memory circuit 320, may perform functions as described above for the similarly named and numbered elements in systems 100 and 200, except as described below. Prefetcher circuit 301 generates prefetch request 307 that includes four prefetch addresses 305a-305d (collectively 305). Prefetch deny list circuit 310 includes six PDL entries 315a-315f (collectively 315), each PDL entry 315 including four respective count values, count 317aa-317fd (collectively 317).

System 300 performs functions in a similar manner to systems 100 and 200, including tracking counts of how many consecutive times prefetched cache entries in cache memory circuit 320, including prefetched cache entries 355a-355d (collectively 355), are evicted without being used. As shown, prefetcher circuit 301 is configured to generate prefetch requests that include one or more prefetch addresses, thereby allowing one or more cache entries to be filled in response to a single request. Prefetch request 307, as depicted, includes four prefetch addresses 305. After prefetch request 307 is performed (e.g., by a memory management circuit, not shown), prefetched cache entries 355 are filled, each entry corresponding to a different address as indicated by the arrows. Upon an eviction of any one of prefetched cache entries 355, prefetch deny list circuit 310 is configured to allocate a single one of PDL entries 315 to a plurality of cache entries of cache memory circuit 320. A value of a respective count 317 in the single one of PDL entries 315 is adjusted (e.g., incremented or decremented depending on a particular implementation of prefetch deny list circuit 310).

In some embodiments, for example, prefetcher circuit 301 may be configured to generate prefetch request 307 with four prefetch addresses 305 that correspond to memory locations in a memory circuit that may be accessed concurrently, or in another manner, such that a time to access memory locations for all four addresses uses less time than performing four individual memory requests. The four prefetch addresses 305 may correspond to a sequence of consecutive fetch addresses, such as may be used to read a file from memory or to fetch a long sequence of instructions for an executing application. In other embodiments, the four prefetch addresses may not be consecutive, but rather may correspond to four different memory circuits that are able to be accessed concurrently.

When one of prefetched cache entries 355 is evicted (e.g., prefetched cache entry 355a), eviction indication 360 is sent to prefetch deny list circuit 310, and includes an indication whether prefetched cache entry 355a was accessed prior to being evicted. As illustrated, prefetched cache entry 355a corresponds to prefetch address 305a, which maps to PDL entry 315e. One of counts 317ea-317ed (e.g., 317ea) is allotted to prefetch address 305a and the value of count 317ea is adjusted based on eviction indication 360. For example, if prefetched cache entry 355a went unused, then count 317ea may be incremented. In other embodiments, count 317ea may be decremented if prefetched cache entry 355a went unused.

At a later point in time, prefetch deny list circuit may receive an indication of another instance of prefetcher circuit 301 issuing prefetch request 307, including prefetch addresses 305 that span prefetched cache entries 355. Prior to performing prefetch request 307, one or more of prefetch addresses 305 are, as shown, sent to prefetch deny list circuit 310. Prefetch deny list circuit 310 may then identify the corresponding PDL entry 315e and determine corresponding counts 317ea-317ed for respective prefetch addresses 305. In some embodiments, prefetch deny list circuit 310 may deny a respective prefetch for each respective prefetch address 305 with a corresponding count 317 that satisfies a threshold value. For example, if counts 317ea-317ed correspond, respectively, to prefetch addresses 305a-305d, then prefetch operations are denied for any of prefetch addresses 305 with a corresponding count 317ea-317ed that satisfies the threshold. Prefetch operations may continue for ones of prefetch addresses 305 for which the corresponding count 317ea-317ed does not satisfy the threshold.

In other embodiments, if any of counts 317ea-317ed satisfy the threshold, then prefetch request 307 may be denied in its entirety, resulting in no information from any of prefetch addresses 305 being prefetched. Such an implementation may be used in systems in which prefetcher circuit 301 is able to adjust a number of prefetch addresses included in a given prefetch requests. In such systems, prefetcher circuit 301 may increase a number of prefetch addresses included in a given prefetch request as long as mispredicted fetches are avoided, up to a maximum number of prefetch addresses per request. Denying prefetch operations for all prefetch addresses in a given prefetch request if the corresponding count for just one of the prefetch addresses satisfies the threshold may prevent an overly aggressive prefetcher circuit from issuing a string of prefetch requests during a particular portion of code execution, thereby reducing a number of unused prefetch operations being performed.

In a different embodiment, the plurality of count values in a given PDL entry may correspond to different sectors of the PDL entry. As described above, prefetch deny list circuit 310 is configured to allocate a single one of PDL entries 315 (e.g., PDL entry 315c) to a plurality of cache entries of cache memory circuit 320. A common tag may be used in PDL entry 315c for all cache entries that map to PDL entry 315c based on the respective prefetch addresses. One or more bits of the prefetch addresses may then be used to select a corresponding one of counts 317ca-317cd corresponding to a particular sector representing the prefetch address. Although the four illustrated counts 317ca-317cd may correspond to four sectors per entry, any suitable number of sectors per entry may be used in other embodiments. Use of such sectoring of PDL entries 315 may result in use of a smaller memory array (or fewer memory arrays of a given size) to implement the prefetch deny list circuit. Since multiple prefetch addresses may map to a common tag, the tag does not need to be repeated for each prefetch addresses that hits in prefetch deny list circuit 310, thereby reducing a physical size, and possibly power consumption, of prefetch deny list circuit 310.

It is noted that the system depicted in FIG. 3 is merely examples to demonstrate the disclosed concepts. Although four prefetch addresses are shown in the single prefetch request, in other embodiments, any suitable number of prefetch addresses may be included. In addition, although four count values are shown for each PDL entry, any suitable number of count values may be included for each PDL entry.

The descriptions related to FIGS. 1-3 disclose prefetcher circuits that are configured to issue prefetch requests. Prefetcher circuits may be configured to issue prefetch requests using a variety of techniques. One such technique is shown in FIG. 4.

Figure 4:
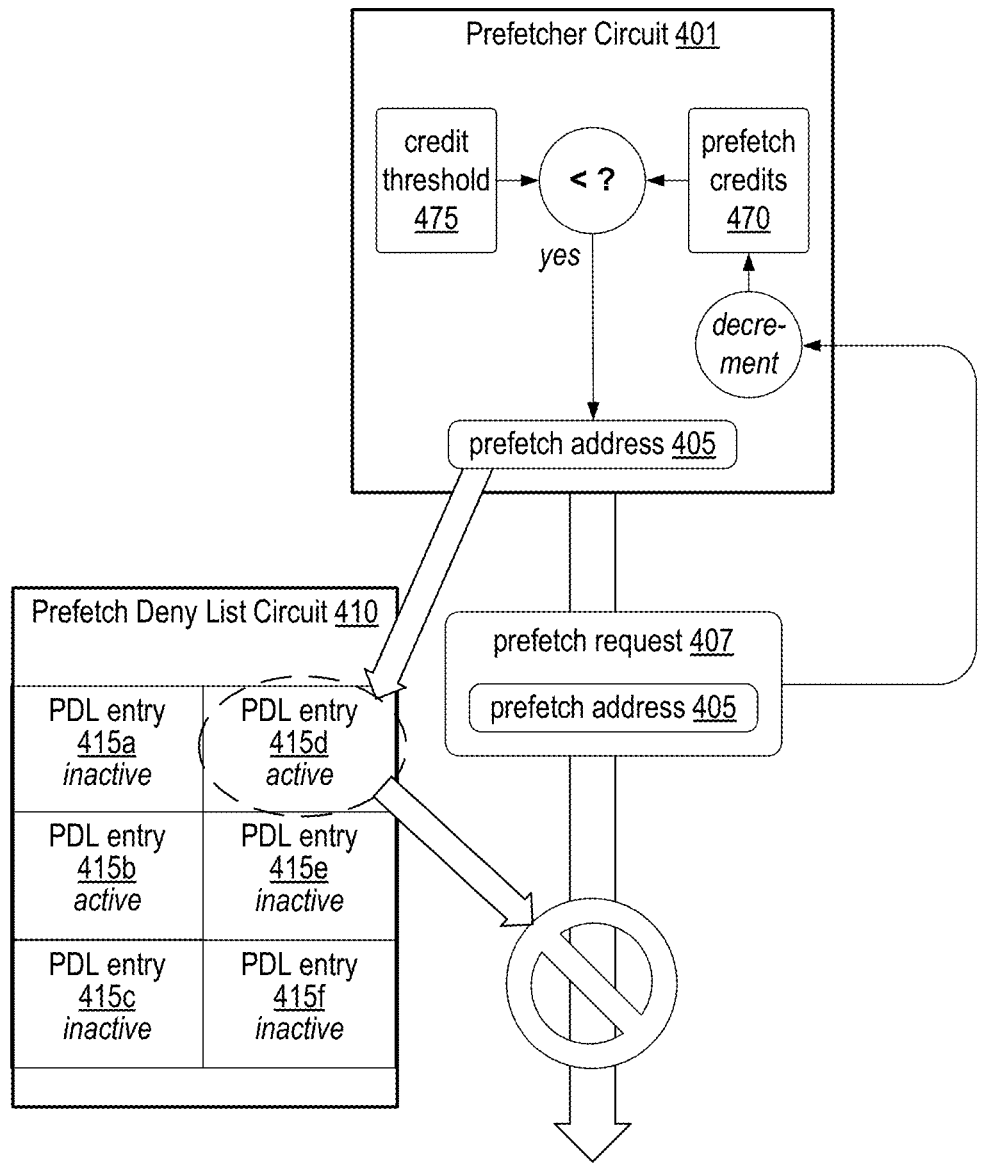
FIG. 4 illustrates a block diagram of an embodiment of a system that includes a prefetch deny list circuit in which credits are used to determine whether to deny a prefetch request.

Proceeding to FIG. 4, a block diagram of an embodiment of system that includes a prefetcher circuit that is configured to use credits for issuing prefetch requests is illustrated. As shown, system 400 includes prefetcher circuit 401 and prefetch deny list circuit 410, which may perform functions as described above for the similarly named and numbered elements in systems 100, 200, and 300, except as described below. Prefetcher circuit 401 uses prefetch address 405 to generate prefetch request 407 based on a number of prefetch credits 470 as compared to credit threshold 475.

As illustrated, prefetcher circuit 401 is configured to issue prefetch requests based on whether a current number of prefetch credits 470 satisfies credit threshold 475. Prefetcher circuit 401 may earn additional prefetch credits 470 based on one or more conditions, such as a number of system clock cycles elapsing without a prefetch being issued, a number of prefetched cache lines that are used prior to being evicted, a ratio of used prefetched cache lines to a total number of prefetched cache lines, and the like. Prefetch credits 470 may be decremented in response to a successful prefetch of a cache line. Such a credit-based technique for managing prefetch requests may reduce a risk of a memory management circuit being overwhelmed by prefetch requests which could result in the memory management circuit being unable to fulfil more time sensitive memory fetch requests.

Prefetcher circuit 401, as shown, is further configured to decrement, in response to the denial of a particular prefetch request, a number of prefetch credits 470 as if the particular prefetch request was performed. For example, prefetcher circuit 401 generates prefetch request 407 with prefetch address 405. Prior to prefetch request 407 being performed, an indication of prefetch address 405 is sent to prefetch deny list circuit 410. As shown, prefetch address 405 corresponds to PDL entry 415d, which is determined to be active. Since PDL entry 415d is active, prefetch request 407 is denied, despite prefetcher circuit 401 having an adequate number of prefetch credits 470. Although prefetch request 407 is denied, an indication is sent to prefetcher circuit 401 that indicates that prefetch request 407 was performed successfully, causing a respective decrement to prefetch credits 470 as if prefetch request 407 actually was performed successfully.

By treating denied prefetch requests as being performed successfully and decrementing credits accordingly, prefetcher circuit 401 may be restricted from filling a memory fetch queue with a series of prefetch requests that may continue to go unused. For example, at certain points in code execution, conditional branching instructions may result in unpredictable program flow which could lead to an increase in unused prefetch requests. As a low number of prefetch credits 470 may be indicative of a recent string of unused prefetch requests, maintaining the low number of credits during troublesome portions of code execution may prevent an excess number of prefetch requests being performed that will go unused.

It is noted that FIG. 4 is merely an example. A simple credit-based technique for issuing prefetch requests is shown in order to illustrate the disclosed techniques. In other embodiments, use of a prefetch deny list circuit may be used in conjunction with any suitable techniques for issuing prefetch requests.

Figure 5:
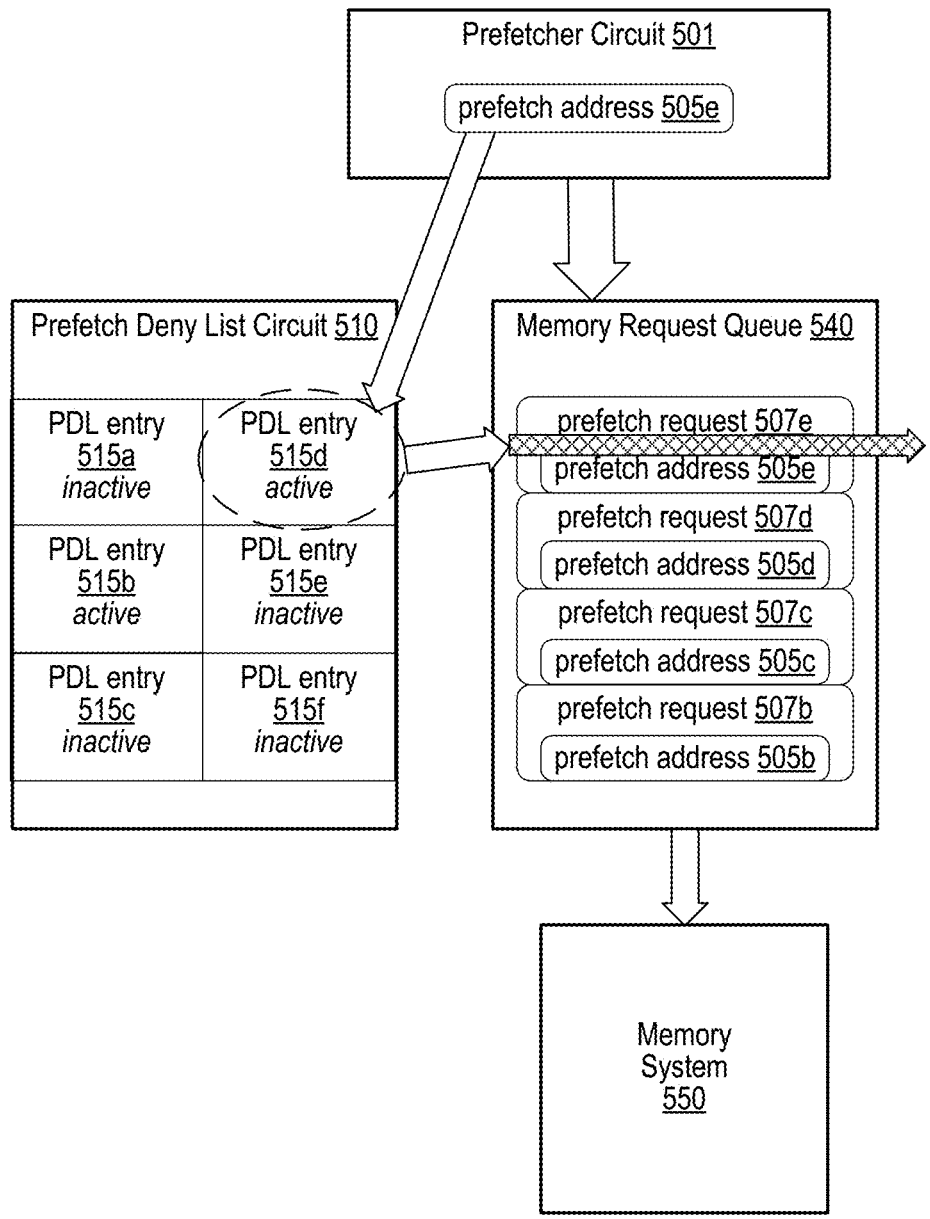
FIG. 5 shows a block diagram of an embodiment of a system in which a prefetch request is queued before a prefetch deny list circuit determines whether to deny the prefetch request.

In the embodiments described in FIGS. 1-4, the prefetch deny list circuit is described as denying a prefetch request that is associated with an active PDL entry. To deny a prefetch request in some embodiments, the prefetch deny list circuit may cause a prefetcher circuit to prevent issue of the denied prefetch request to a corresponding memory request queue. The denied prefetch request in such embodiments may never leave the prefetcher circuit. In other embodiments, the prefetch deny list circuit may not receive a prefetch address before the associated prefetch request is sent to the memory request queue. FIG. 5 depicts such an embodiment.

Moving now to FIG. 5, a block diagram of an embodiment of a system that includes a memory request queue and utilizes a prefetch deny list circuit to manage prefetch requests in the memory request queue. As shown, system 500 includes prefetcher circuit 501, prefetch deny list circuit 510, and memory system 550, all which may perform functions as described above for the similarly named and numbered elements in systems 100, 200, 300, and 400, with exceptions disclosed below. System 500 further includes memory request queue 540, which receives prefetch requests issued by prefetcher circuit 501.

As illustrated, prefetcher circuit 501 is configured to generate prefetch requests 507b-507e (collectively 507) including respective prefetch addresses 505b-505e (collectively 505). Prefetcher circuit 501 is also configured to send prefetch requests 507b-507d to memory request queue 540, and to, concurrently, send the corresponding prefetch addresses 505b-505d to prefetch deny list circuit 510. Prefetch deny list circuit 510 is configured to access a respective one of PDL entries 515 for each of the received prefetch addresses 505b-505d. Prefetch addresses 505b-505d may be received serially, as each respective prefetch request 507b-507d is serially sent to memory request queue 540. In the illustrated example, respective entries for prefetch addresses 505b-505d may be inactive, thereby allowing each respective prefetch request 507b-507d to proceed through memory request queue 540.

Prefetch deny list circuit 510 is further configured to receive prefetch address 505e from prefetcher circuit 501 after prefetch request 507e has been generated and sent to memory request queue 540. Prefetch deny list circuit 510 may identify PDL entry 515d as a corresponding PDL entry to prefetch address 505e. In response to determining that PDL entry 515d is active, prefetch deny list circuit 510 denies prefetch request 507e by causing prefetch request 507e to be removed from memory request queue 540. In various embodiments, prefetch deny list circuit 510 may send an indication to deny prefetch request 507e to memory request queue 540, or may send indication to deny prefetch request 507e to prefetcher circuit 501 which may, in turn, remove prefetch request 507e from memory request queue 540.

In some embodiments, prefetch deny list circuit may be further configured to modify, in response to a determination that a given PDL entry is inactive, a priority of the given prefetch request, thereby causing a cache line filled by the given prefetch request to have a different lifetime. For example, PDL entry 515a may correspond to prefetch address 505c of prefetch request 507c. In response to receiving prefetch address 505c, prefetch deny list circuit 510 accesses PDL entry 515a and determines that PDL entry 515a is inactive. As disclosed above, in some embodiments, one or more count values are included in each PDL entry 515. Prefetch deny list circuit 510 may use such a count value, or other information included in PDL entry 515a, to determine whether a priority of prefetch request 507c should be modified. Prefetch deny list circuit 510 may, for example, determine that PDL entry 515a was recently deactivated, indicating that information from prefetch address 505c was recently accessed. Such an indication may result in a priority of prefetch request 507c being increased. A cache line subsequently filled based on information retrieved by prefetch request 507c may be allotted a longer lifetime, thereby increasing a chance that the cache line is hit before being evicted.

In other cases, prefetch deny list circuit 510 may determine that PDL entry 515a just missed a threshold for being activated, indicating that information from prefetch address 505c has not been recently accessed. In response, a priority of prefetch request 507c may be decreased. A cache line subsequently filled based on information retrieved by prefetch request 507c, in this case, may be allotted a shorter lifetime, thereby decreasing an amount of time before the cache line is evicted.

It is noted that the embodiment of FIG. 5 is an example for demonstrative purpose. Although memory request queue is shown with four requests, any suitable number of requests may be queued. Other elements of system 500, such as a cache memory circuit, processors, load-store units, and the like are omitted for clarity.

To summarize, various embodiments of a system that utilizes a prefetch deny list circuit are disclosed. In an example apparatus, a cache memory circuit, a prefetcher circuit, and a prefetch deny list circuit, including a plurality of entries, may be included. The cache memory circuit may be configured to store information retrieved from a lower-level memory. The prefetcher circuit may be configured to generate a prefetch request for a particular prefetch address. The prefetch deny list circuit may be configured to allocate, in response to an indication from the cache memory circuit that a previously prefetched address went unused, a given entry, of the plurality of entries, for the previously prefetched address. The prefetch deny list circuit may be further configured to determine whether a particular address for a particular prefetch request corresponds to an active one of the plurality of entries. In response to a determination that a particular active entry corresponds to the particular address, prefetch deny list circuit may deny the particular prefetch request.

In a further example, the prefetch deny list circuit may be further configured to increment a corresponding count value in response to the indication. The prefetch deny list circuit may also be configured to activate the given entry in response to a determination that the corresponding count value satisfies a threshold value.

In an example, the prefetch deny list circuit may be further configured to, in response to an indication from the cache memory circuit that a previously prefetched address was used, reset the corresponding count value to an initial value thereby deactivating the given entry. In another example, the prefetch deny list circuit may also be configured to, in response to a determination that the particular entry has not been activated, allow the particular prefetch request to continue.

In an example, the cache memory circuit may be further configured to, in response to an eviction of a cache line, read a prefetch indicator from a cache tag of the evicted cache line. The prefetch deny list circuit may also be configured to, in response to a determination that the read prefetch indicator is set, send an indication of an address of the evicted cache line to the prefetch deny list circuit as an indication that the evicted cache line went unused.

In a further example, the prefetch deny list circuit may be further configured to allocate a single one of the plurality of entries to a plurality of cache lines of the cache memory circuit. In another example, the prefetcher circuit may also be configured to, in response to the denial of the particular prefetch request, decrement a number of credits as if the particular prefetch request was performed.

In an example, the prefetch deny list circuit may also be configured to receive the particular address from the prefetcher circuit after the particular prefetch request has been generated, and to deny the particular prefetch request by causing the particular prefetch request to be removed from a fetch request queue. In another example, the prefetcher circuit may be further configured to generate the prefetch request in response to a determination that the particular prefetch address results in a cache miss in the cache memory circuit.

The circuits and techniques described above in regards to FIGS. 1-5 may be performed using a variety of methods. Three methods associated with using a prefetch deny list circuit are described below in regards to FIGS. 6-8.

Turning now to FIG. 6, a flow diagram for an embodiment of a method for operating a prefetch deny list circuit is illustrated. Method 600 may be performed by any of the systems disclosed herein, such as systems 100-500 of FIGS. 1-5. In some embodiments, some or all of the operations of method 600 may be performed using instructions included in a non-transient, computer-readable storage medium having program, the instructions being executable by ones of systems 100-500 to cause the operations described with reference to FIG. 6. Method 600 is described below using system 200 of FIG. 2 as an example. References to elements in FIG. 2 are included as non-limiting examples.

At 610, method 600 begins by receiving, by a prefetch deny list circuit from a cache memory circuit, an indication that a cache entry corresponding to a previously prefetched address was evicted untouched. For example, cache memory circuit 120 may send, to prefetch deny list circuit 110, eviction indication 260 indicative of evicting prefetched cache entry 255 corresponding to, e.g., prefetch address 205 that was used in a prior prefetch request issued by prefetcher circuit 101 and resulted in prefetched cache entry 255 being filled with information retrieved from prefetch address 205. Cache memory circuit 120 may include, in eviction indication 260, some or all of prefetch address 205 (e.g., cache tag 257), as well as an indicator (PF 258) that prefetched cache entry 255 went unused from the time it was filled with the information from prefetch address 205 to the time prefetched cache entry 255 was evicted.

Method 600 continues at 620 with the prefetch deny list circuit incrementing a count value corresponding to the previously prefetched address. As shown in FIG. 2, prefetch deny list circuit 110 includes a plurality of PDL entries 115. In some embodiments, cache tag 257 may be used to select a particular one of PDL entries 115, such as PDL entry 115e. Each of PDL entries 115 includes a respective count 217 used to track a number of times a corresponding prefetch address has been evicted without having been used. In the current example, count 217e is incremented in response to prefetch deny list circuit 110 receiving eviction indication 260. In other embodiments, count 217e may begin at an initial value and be decremented in response to eviction indication 260.

At 630 method 600 proceeds with the prefetch deny list circuit receiving, from a prefetcher circuit, an address indicator for a prefetch address for a particular prefetch request to be performed. At a subsequent point in time, prefetch request 207 may be generated by prefetcher circuit 101 using prefetch address 205. An address indicator corresponding to prefetch address 205 is sent to prefetch deny list circuit 110. In some embodiments, the address indicator may be received, by prefetch deny list circuit 110, prior to prefetch request 207 being generated. In other embodiments, prefetch deny list circuit 110 may receive the address indicator concurrently with, or after, the generation of prefetch request 207. One of PDL entries 115 may be identified, by prefetch deny list circuit 110, using the address indicator for prefetch address 205.

Method 600 continues at 640 by, in response to determining that a count value corresponding to the prefetch address for the particular prefetch request satisfies a threshold value, denying, by the prefetch deny list circuit, the particular prefetch request. As illustrated in FIG. 2, PDL entry 115e corresponds to prefetch address 205. If count 217e satisfies the threshold value (e.g., count 217e is greater than or equal to or greater than the threshold), then prefetch request 207 may be denied from proceeding, and no cache entry may be filled with information at prefetch address 205 in memory system 250. Otherwise, if count 217e does not satisfy the threshold value, then prefetch request 207 may be allowed to proceed, resulting in a cache entry in cache memory circuit 120 (e.g., prefetched cache entry 255) being filled with information retrieved from memory system 250 at prefetch address 205.

Accordingly, use of prefetch deny list circuit 110 may reduce a number of times a prefetch requests results in an unnecessary fetch of information from memory system 250. Such a reduction may preserve more cache entries in cache memory circuit 120 for information that will be used. The reduction may also reduce traffic into and out of memory system 250, thereby reducing memory access times for other memory fetches. Power consumption of system 200 may also be reduced due to the reduction in unnecessary processing that would accompany prefetch operations from addresses that repeatedly go unused.

It is noted that the method of FIG. 6 includes blocks 610-640. Method 600 may end in block 640 or may repeat some or all blocks of the method. For example, method 600 may repeat blocks 610 and 620 for other prefetched cache lines that go unused. In some cases, method 600, or a portion thereof, may be performed concurrently with other instantiations of the method. For example, system 200 in FIG. 2 may include a plurality of prefetch deny list circuits if multiple cache memory circuits are included, such as in a multicore processor system in which each core, or multiple clusters of cores, has a respective cache memory circuit.

Proceeding now to FIG. 7, a flow diagram for another embodiment of a method for operating a prefetch deny list circuit is illustrated. Similar to method 600, method 700 may be used in conjunction with any of the systems disclosed herein, such as systems 100-500. Some or all of the operations of method 700 may, in some embodiments, be performed using instructions stored in a non-transient, computer-readable storage medium that are executable by ones of systems 100-500 to cause the operations described with reference to FIG. 7. Method 700 is described below using system 200 of FIG. 2 as an example. References to elements in FIG. 2 are included as non-limiting examples.

Method 700 begins in 710 with a prefetch deny list circuit receiving, from a cache memory circuit, an indication that a prefetch address for a particular prefetch request has been hit. For example, prefetch deny list circuit 110 receives eviction indication 260 from cache memory circuit 120 in response to an eviction of prefetched cache entry 255. Eviction indication 260 may include an indication of prefetch address 205 that corresponds to prefetched cache entry 255, such as cache tag 257. In addition to an indication of prefetch address 205, cache tag 257 includes PF 258, which may indicate whether prefetched cache entry 255 has been hit since being filled by a respective prefetch request. For example, PF 258 may be set to a particular value to indicate that information in prefetched cache entry 255 was retrieved using a prefetch request. PF 258 may be reset to a different value at a first occurrence of a cache hit to prefetched cache entry 255, thereby indicating that information from prefetch address 205 has been used. In the current example, PF 258 is rest to indicate that prefetched cache entry 255 has been hit.

At 720, method 700 proceeds with the prefetch deny list circuit resetting a count value corresponding to the prefetch address for the particular prefetch request. Referring to FIG. 2, prefetch address 205 corresponds to PDL entry 115e. If prefetch address 205 has been used in prior prefetch requests, but never used while respective cache entries were valid, then count 217e is set to a value that indicates a number of consecutive times that prefetch address 205 was prefetched without being used. In some embodiments, count 217e may, prior to the receiving of eviction indication 260, have a value that satisfies a threshold value, thereby activating PDL entry 115e. In other embodiments, count 217e may not yet satisfy the threshold value. In response to a determination that PF 258 indicates that prefetch cache entry 255 has been hit, count 217e is reset, e.g., to zero or to a different initial value. This resetting occurs regardless of a current value of count 217e, e.g., regardless if PDL entry 115e is active or inactive.

Method 700 continues at 730 with the prefetch deny list circuit receiving, from a prefetcher circuit, an address indicator for the prefetch address for a subsequent prefetch request to be performed. At some point after count 217e is reset in 720, prefetcher circuit 101, as shown, generates prefetch request 207 including prefetch address 205. Prefetcher circuit 101 sends an indication of prefetch address 205 to prefetch deny list circuit 110. In various embodiments, prefetch address 205 may be sent prior to, concurrent with, or after the generation of prefetch request 207. Prefetch deny list circuit 110 uses the indication of prefetch address 205 to identify PDL entry 115e.

At 740, method 700 proceeds by, in response to determining that the count value corresponding to the prefetch address fails to satisfy a threshold value, allowing, by the prefetch deny list circuit, the subsequent prefetch request to be processed. For example, count 217e, after being reset at 720 of method 700, may remain at a value that fails to satisfy the threshold value. Prefetch deny list circuit 110 may, therefore, allow prefetch request 207 to proceed, thereby allowing a cache entry (e.g., prefetched cache entry 255) to be filled by information retrieved from memory system 250 at prefetch address 205. In some embodiments, a priority of prefetch request 207 may be adjusted based on a current value of count 217e. For example, if there were no other prefetches at prefetch address 205 between the resetting of count 217e and the receiving of prefetch address 205 at 730, then a priority of prefetch request 207 may be increased. In contrast, if there have been one or more additional prefetches at prefetch address 205 that went unused after the resetting of count 217e and the reception of prefetch address 205 at 730, then a priority of prefetch request 207 may be lowered.

It is noted that method 700 includes blocks 710-740. Method 700 may end in block 740 or may repeat some or all blocks of the method. For example, method 700 may repeat 730 and 740 one or more times in response to receiving other prefetch addresses from prefetcher circuit 101. In a manner as described above for method 600, method 700 may be performed concurrently with other instantiations of itself and/or method 600. For example, an instance of method 600 may be performed by a first prefetch deny list circuit while an instance of method 700 is performed by a second prefetch deny list circuit.

Figure 8:
FIG. 8 shows a flow diagram of an embodiment of another method for training a prefetch deny circuit.

Proceeding now to FIG. 8, a flow diagram for another embodiment of a method for operating a prefetch deny list circuit is shown. Similar to methods 600 and 700, method 800 may be used in conjunction with any of the systems disclosed herein, such as systems 100-500. In a similar manner as described above, some or all of the operations of method 800 may be performed using instructions stored in a non-transient, computer-readable storage medium that are executable by ones of systems 100-500 to cause the operations described with reference to FIG. 8. Method 800 is described below using system 200 of FIG. 2 as an example. References to elements in FIG. 2 are included as non-limiting examples.

Method 800 begins at 810 with a prefetch deny list circuit receiving, from a cache memory circuit, a different indication that a different prefetched address went unused. Returning to the example of FIG. 2, cache memory circuit 120 may send a different eviction indication corresponding to a different prefetch address than described in regards to methods 600 and 700. Prefetch deny list circuit 110 may use an address indication from the different eviction indication to access a particular one of PDL entries 115 corresponding to the different prefetched address.

At 820, method 800 continues by, in response to determining that a count value corresponding to the different prefetched address has not been created, initializing a corresponding count value with a value of zero. If the corresponding PDL entry 115 has not been generated, then prefetch deny list circuit 110 may create the corresponding entry and initialize a respective count 217 to a value of, for example, zero. In other embodiments, the initialized value may be any suitable value.

It is noted that method 800 includes blocks 810 and 820. Method 800 may end in 820 or may repeat some or all operations of the method. For example, method 800 may return to 810 in response to receiving another indication of an eviction of another prefetched cache entry. Method 800 may be performed concurrently with other instantiations of itself and/or methods 600 and 700.

The prefetch deny list circuits described above may utilize memory circuits, such as static random-access memory (SRAM) for storing all of the PDL entries. The more entries that are available to map to prefetch addresses, the more effective a prefetch deny list circuit may perform. Adding an adequate amount of memory for prefetch deny list circuits, however, may use a non-trivial amount of die area. Accordingly, an efficient technique for adding the additional memory circuits is desired. FIG. 9 illustrates two such techniques.

Moving to FIG. 9, two embodiments of a cache memory circuit are shown with prefetch deny list storage arrays included. System 900a includes prefetch deny list (PDL) storage arrays 910a and 910b, prefetch deny list (PDL) logic 915a, cache storage arrays 925a-h, and array logic 930a-930d. System 900b includes PDL storage arrays 910a and 910b, prefetch deny list (PDL) logic 915b, cache storage arrays 925ac, 925bd, 925eg and 925fh, and array logic 930e-930h. Cache memory circuits 920a and 920b represent two different ways to implement storage circuits for a prefetch deny list circuit (e.g., prefetch deny list circuit 110 in FIG. 1) by adding memory arrays with memory arrays used for cache storage.

In system 900a, PDL storage arrays 910a and 910b are added to cache memory circuit 920a. As illustrated, cache memory circuit 920a includes eight cache storage arrays 925a-925h. Cache storage arrays 925a-925h provide the memory needed for caching fetched and prefetched information from lower-level memory circuits. In various embodiments, cache storage arrays 925a-925h may be used with L1, L2, or L3 cache circuit, including for example, cache memory circuits 120 and 320 in FIGS. 1-3. PDL storage arrays 910a-910b and cache storage arrays 925a-925h may be implemented using a same type of memory circuit, such as SRAM.

Array logic 930a-930d provide a pipeline for accessing cache lines stored in one or more of cache storage arrays 925a-925h. Array logic 930a may be used for accessing cache storage arrays 925a and 925c, array logic 930b for accessing cache storage arrays 925b and 924d, array logic 930c for accessing cache storage arrays 925e and 924g, and array logic 930d may be used for accessing cache storage arrays 925f and 924h. In cache memory circuit 920a, cache storage arrays 925a-925h are implemented as separate memory arrays. Accordingly each memory array may be accessed independently via a respective one of array logic 930a-930d.

PDL logic 915a provides a pipeline for accessing PDL entries stored in PDL storage arrays 910a and 910b. PDL logic 915a is independent from array logic 930a-930d, allowing for concurrent access to PDL entries and cache entries. By placing PDL storage arrays 910a and 910b in cache memory circuit 920a, some reuse of memory signals may be achieved. For example, SRAM circuits used in PDL storage arrays 910a and 910b and cache storage arrays 925a-925h may use different power supply voltages and different clock signals than general logic circuits. Placing the PDL and cache storage arrays together may allow reuse of these signals as well as, in some embodiments, any voltage level shifting circuits that may be used to compensate for the different voltage levels. As indicated in FIG. 9, cache memory circuit 920a has dimensions of X(a) by Y(a). Including PDL storage arrays 910a and 910b result in additional die area in the Y dimension as indicated by delta Y.

System 900b illustrates implementation changes to cache memory circuit 920b that may be used to further reduce a die size impact from adding PDL storage arrays to a cache memory circuit. As depicted, several design changes have been implemented to reduce the die area of cache memory circuit 920b. First, cache storage arrays are merged to reduce a size of the combined arrays in comparison to the separate arrays used in cache memory circuit 920a. As shown, pairs of cache storage arrays 925a-925h have been merged to create four pairs of merged arrays rather than eight separate arrays. This merger may allow for more shared control signals from array logic 930e-930h, thereby reducing routing and other overhead for accessing cache lines stored in these merged cache storage arrays 925ac, 925bd, 925eg, and 925fh. These changes reduce the X dimension of cache memory circuit 920b, as shown.

A second design change includes dividing PDL storage arrays into a larger number of smaller arrays. Rather than the two PDL storage arrays 910a and 910b in cache memory circuit 920a, there are eight PDL storage arrays 910c-910j. Each of PDL storage arrays 910c-910j may be sized such that one or more of PDL storage arrays 910c-910j can be stacked to a same height as one of the merged cache storage arrays. PDL storage arrays 910c-910j are placed on the left and right (as shown) of the merged cache storage arrays to take advantage of the size reduction of the merged cache storage arrays in the X dimension. As shown, addition of PDL storage arrays 910c-910j results in a modest increase in the X dimension as indicated by delta X (left and right). PDL logic 915b may be sized fit adjacent to the array logic 930e-930h so as to limit or avoid an increase in the Y dimension. By implementing such changes, PDL storage arrays may be added to cache memory circuit 920b with a smaller die area increase than what is illustrated for cache memory circuit 920a. In addition to reducing die area, the implementation of cache memory circuit 920b may further reduce power consumption and/or latency for accessing PDL entries due to less signal routing.

It is noted that FIG. 9 is merely an example for demonstrating implementations of the disclosed techniques. Although particular numbers cache storage arrays and PDL storage arrays are shown, any suitable number of each may be used in other embodiments. The array logic is shown as two separate blocks, but may be implemented in any suitable number of blocks, including as a single circuit block, or as a sea-of-gates.

Figure 10:
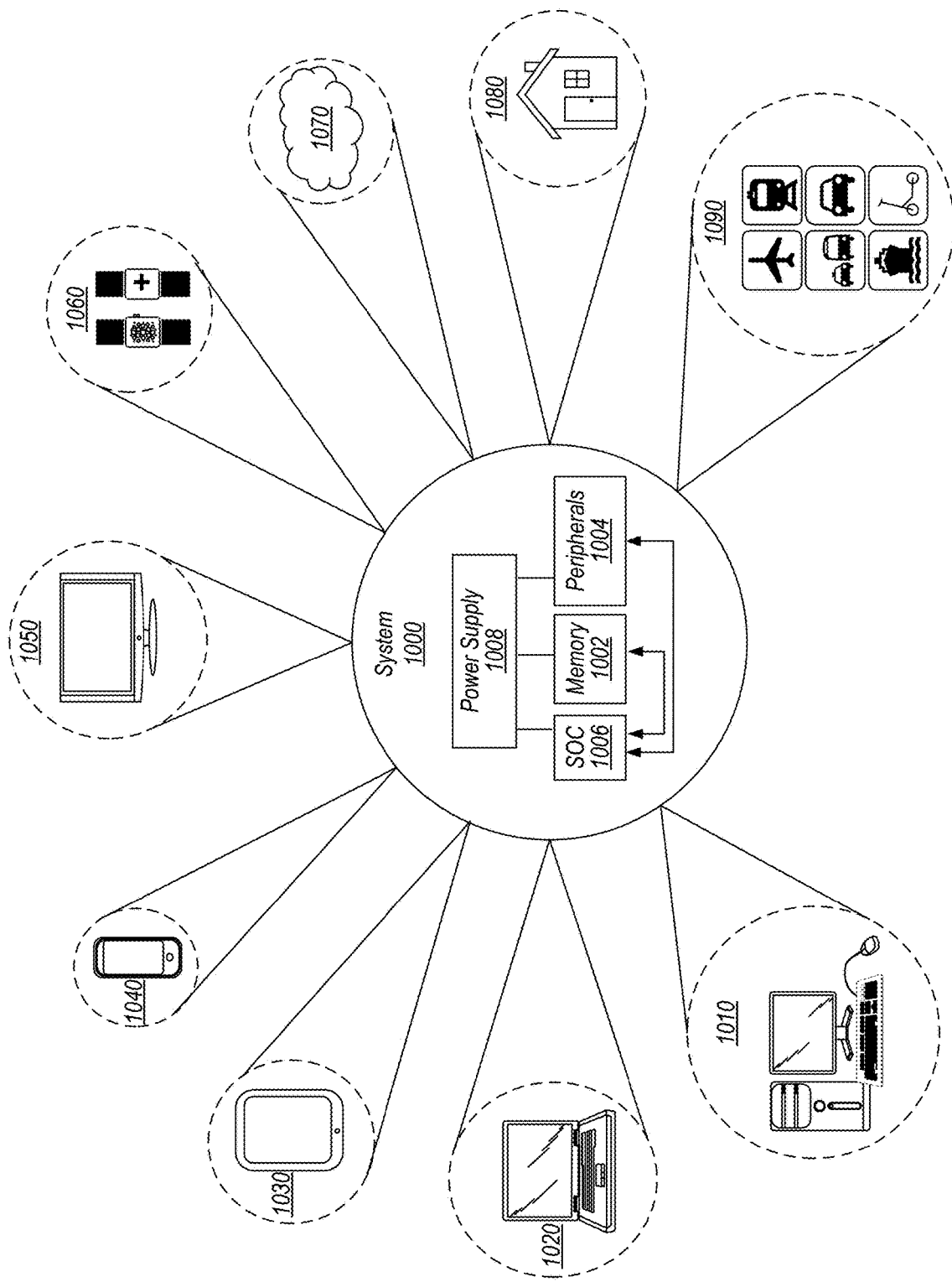
FIG. 10 depicts various embodiments of systems that include integrated circuits that utilize the disclosed techniques.

FIGS. 1-9 illustrate circuits and methods for a system, such as an integrated circuit, that includes a prefetch deny list circuit in the integrated circuit. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of system 1000 is illustrated in FIG. 10. System 1000 may, in some embodiments, include any disclosed embodiment of systems 100-500 in FIGS. 1-5.

In the illustrated embodiment, the system 1000 includes at least one instance of a system on chip (SoC) 1006 which may include multiple types of processor circuits, such as a central processing unit (CPU), a graphics processing unit (GPU), or otherwise, a communication fabric, and interfaces to memories and input/output devices. One or more of these processor circuits may correspond to an instance of processor cores disclosed herein. In various embodiments, SoC 1006 is coupled to external memory circuit 1002, peripherals 1004, and power supply 1008.

A power supply 1008 is also provided which supplies the supply voltages to SoC 1006 as well as one or more supply voltages to external memory circuit 1002 and/or the peripherals 1004. In various embodiments, power supply 1008 represents a battery (e.g., a rechargeable battery in a smart phone, laptop or tablet computer, or other device). In some embodiments, more than one instance of SoC 1006 is included (and more than one external memory circuit 1002 is included as well). In some embodiments, SoC 1006 may include one or more instances of prefetcher circuits 101-501, cache memory circuit 120, and/or prefetch deny list circuit 110-510, as well as other elements shown in FIGS. 1-5.

External memory circuit 1002 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 702 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration. In some embodiments, external memory circuit 1002 may correspond to all or a portion of memory system 250 or 550 in FIGS. 2 and 5.

The peripherals 1004 include any desired circuitry, depending on the type of system 1000. For example, in one embodiment, peripherals 1004 includes devices for various types of wireless communication, such as Wi-Fi, Bluetooth, cellular, global positioning system, etc. In some embodiments, the peripherals 1004 also include additional storage, including RAM storage, solid state storage, or disk storage. The peripherals 1004 include user interface devices such as a display screen, including touch display screens or multi-touch display screens, keyboard or other input devices, microphones, speakers, etc.

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 1060 are contemplated as well, such as devices worn around the neck, devices attached to hats or other headgear, devices that are implantable in the human body, eyeglasses designed to provide an augmented and/or virtual reality experience, and so on.

System 1000 may further be used as part of a cloud-based service(s) 1070. For example, the previously mentioned devices, and/or other devices, may access computing resources in the cloud (i.e., remotely located hardware and/or software resources). Still further, system 1000 may be utilized in one or more devices of a home 1080 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 10 is the application of system 1000 to various modes of transportation 1090. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise.

It is noted that the wide variety of potential applications for system 1000 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 10 are illustrative only and are not intended to be limiting. Other devices are possible and are contemplated.

As disclosed in regards to FIG. 10, computer system 1000 may include one or more integrated circuits included within a personal computer, smart phone, tablet computer, or other type of computing device. A process for designing and producing an integrated circuit using design information is presented below in FIG. 11.

Figure 11:
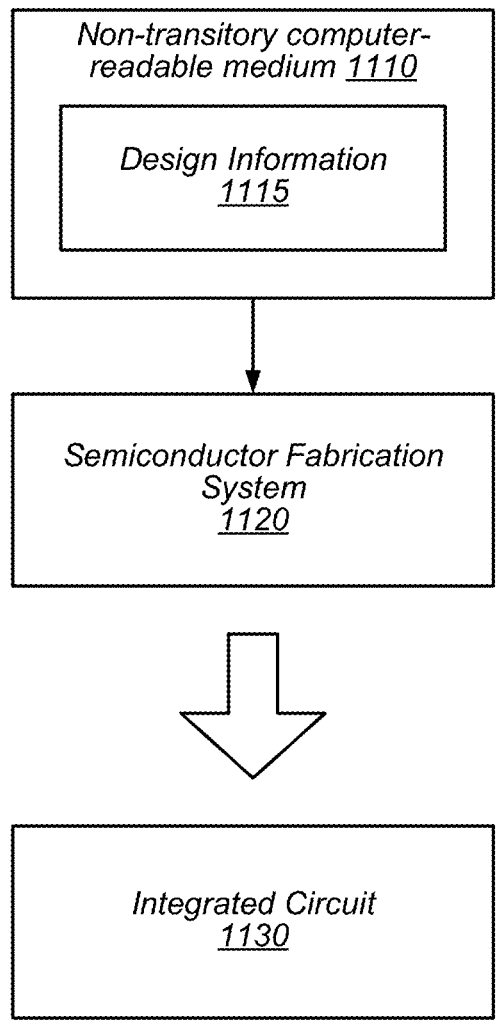
FIG. 11 is a block diagram of an example computer-readable medium, according to some embodiments.

FIG. 11 is a block diagram illustrating an example of a non-transitory computer-readable storage medium that stores circuit design information, according to some embodiments. The embodiment of FIG. 11 may be utilized in a process to design and manufacture integrated circuits, for example, including one or more instances of systems (or portions thereof) 100-500 shown in FIGS. 1-5. In the illustrated embodiment, semiconductor fabrication system 1120 is configured to process the design information 1115 stored on non-transitory computer-readable storage medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, System Verilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus comprising:
   a cache memory circuit configured to store information retrieved from a lower-level memory;
   a prefetcher circuit configured to generate a prefetch request for a particular prefetch address; and
   a prefetch deny list circuit, including a plurality of entries, configured to:
   in response to an indication from the cache memory circuit that a previously prefetched address was evicted untouched, allocate, in the plurality of entries, a given entry for the previously prefetched address;

determine whether a particular address for a particular prefetch request corresponds to an active one of the plurality of entries; and in response to a determination that a particular entry corresponding to the particular address is active, deny the particular prefetch request.

2. The apparatus of claim 1, wherein the prefetch deny list circuit is further configured to:

increment a corresponding count value in response to the indication; and activate the given entry in response to a determination that the corresponding count value satisfies a threshold value.

3. The apparatus of claim 2, wherein the prefetch deny list circuit is further configured to:

in response to an indication from the cache memory circuit that a previously prefetched address was used, reset the corresponding count value to an initial value thereby deactivating the given entry.

4. The apparatus of claim 1, wherein to determine whether the particular address corresponds to an active one of the plurality of entries, the prefetch deny list circuit is further configured to:

based on a determination that an entry of the plurality of entries is allocated to the particular address, retrieve a value corresponding to the allocated entry; and compare the corresponding value to an activation threshold.

5. The apparatus of claim 1, wherein the cache memory circuit is further configured to:

in response to an eviction of a cache line, read a prefetch indicator from a cache tag of the evicted cache line; and in response to a determination that the read prefetch indicator is set, send an indication of an address of the evicted cache line to the prefetch deny list circuit as an indication that the evicted cache line went unused.

6. The apparatus of claim 1, wherein the prefetch deny list circuit is further configured to allocate a single one of the plurality of entries to a plurality of cache lines of the cache memory circuit.

7. The apparatus of claim 1, wherein the prefetcher circuit is further configured to:

in response to the denial of the particular prefetch request, decrement a number of credits.

8. The apparatus of claim 1, wherein the prefetch deny list circuit is further configured to:

receive the particular address from the prefetcher circuit after the particular prefetch request has been generated; and deny the particular prefetch request by causing the particular prefetch request to be removed from a fetch request queue.

9. The apparatus of claim 1, wherein the prefetcher circuit is further configured to generate the prefetch request in response to a determination that the particular prefetch address results in a cache miss in the cache memory circuit.

10. A method, comprising:

receiving, by a prefetch deny list circuit from a cache memory circuit, an indication that a cache entry corresponding to a previously prefetched address was evicted untouched;

incrementing, by the prefetch deny list circuit, a count value corresponding to the previously prefetched address;

receiving, by the prefetch deny list circuit from a prefetcher circuit, an address indicator for a prefetch address for a particular prefetch request to be performed; and in response to determining that a count value corresponding to the prefetch address for the particular prefetch request satisfies a threshold value, denying, by the prefetch deny list circuit, the particular prefetch request.

11. The method of claim 10, further comprising:

receiving, by the prefetch deny list circuit from the cache memory circuit, an indication that the prefetch address for the particular prefetch request has been hit; and resetting, by the prefetch deny list circuit, the count value corresponding to the prefetch address for the particular prefetch request.

12. The method of claim 11, wherein the resetting occurs regardless of a current value of the count value.

13. The method of claim 10, wherein the address indicator is received prior to the particular prefetch request being generated.

14. The method of claim 10, further comprising:

receiving, by the prefetch deny list circuit from the cache memory circuit, a different indication that a different prefetched address went unused; and in response to determining that a count value corresponding to the different prefetched address has not been created, initializing a corresponding count value with a value of zero.

15. A system comprising:

a cache memory circuit configured to:

store information in a given cache entry in response to a first memory fetch; and evict the given cache entry to store, in the given cache entry, information from a second memory fetch; and a prefetch deny list circuit, including a plurality of entries, and configured to:

in response to a determination that a particular entry of the plurality of entries corresponds to a particular address included in an evicted cache entry:

increment, in the particular entry, a corresponding count value in response to a determination that the evicted cache entry was not accessed; and reset the corresponding count value in response to a determination that the evicted cache entry was accessed; and in response to receiving an indication of a prefetch request that includes the particular address, activate the particular entry in response to a determination that the corresponding count value satisfies a threshold value, wherein activating the particular entry causes the prefetch request to be denied.

16. The system of claim 15, wherein the prefetch deny list circuit is further configured to:

in response to a determination that the corresponding count value does not satisfy the threshold value, modify a priority of the prefetch request, wherein the modified priority sets a lifetime of a cache line filled in response to the prefetch request.

17. The system of claim 16, wherein the prefetch deny list circuit is further configured to modify the priority of the prefetch request based on the corresponding count value.

18. The system of claim 15, wherein the prefetch deny list circuit is further configured to:

determine that the particular entry corresponds to the particular address included in the evicted cache entry using a cache tag of the evicted cache entry; and in response to access to a cache tag of a given evicted cache entry being unavailable, skip training of the prefetch deny list circuit for the given evicted cache entry.

19. The system of claim 15, wherein the prefetch deny list circuit is further configured to:
receive an indication of a given prefetch request that spans a plurality of cache entries;
determine a corresponding count value for respective addresses corresponding to ones of the plurality of cache entries; and
deny a prefetch for each respective address with a corresponding count value that satisfies the threshold value.

20. The system of claim 15, further including a prefetcher circuit; and
wherein the prefetch deny list circuit is further configured to:
in response to a denial of a given prefetch request, send an indication to the prefetcher circuit that the given prefetch request was performed.

* * * * *